(12) United States Patent
Strohkendl et al.

(10) Patent No.: US 8,643,942 B2
(45) Date of Patent: Feb. 4, 2014

(54) COMPENSATION OF THERMALLY INDUCED REFRACTIVE INDEX DISTORTIONS IN AN OPTICAL GAIN MEDIUM OR OTHER OPTICAL ELEMENT

(75) Inventors: Friedrich P. Strohkendl, Santa Monica, CA (US); Vladimir V. Shkunov, San Pedro, CA (US); David A. Rockwell, Culver City, CA (US)

(73) Assignee: Raytheon Company, Waltham, MA (US)

(*) Notice: Subject to any disclaimer, the term of this patent is extended or adjusted under 35 U.S.C. 154(b) by 508 days.

(21) Appl. No.: 12/915,737

(22) Filed: Oct. 29, 2010

(65) Prior Publication Data

US 2012/0105946 A1    May 3, 2012

(51) Int. Cl.
*H04B 10/17* (2011.01)
*G02B 6/024* (2006.01)

(52) U.S. Cl.
USPC .................. 359/341.1; 385/124; 385/129

(58) Field of Classification Search
USPC ............... 359/341.1; 385/123, 124, 129, 130
See application file for complete search history.

(56) References Cited

U.S. PATENT DOCUMENTS

| | | | | |
|---|---|---|---|---|
| 3,636,473 | A * | 1/1972 | Young | 372/33 |
| 4,848,881 | A * | 7/1989 | Kahan et al. | 359/288 |
| 5,909,529 | A | 6/1999 | Bhagavatula | |
| 6,904,219 | B1 * | 6/2005 | Fermann | 385/130 |
| 7,164,818 | B2 | 1/2007 | Bryan et al. | |
| 7,860,360 | B2 | 12/2010 | Rockwell et al. | |
| 7,983,312 | B2 * | 7/2011 | Shkunov et al. | 372/6 |
| 2003/0072343 | A1 * | 4/2003 | Murray et al. | 372/50 |
| 2005/0249473 | A1 * | 11/2005 | Page et al. | 385/129 |
| 2006/0051047 | A1 * | 3/2006 | Beall et al. | 385/141 |
| 2009/0041061 | A1 * | 2/2009 | Shkunov et al. | 372/6 |
| 2010/0189137 | A1 * | 7/2010 | Shkunov et al. | 327/6 |

OTHER PUBLICATIONS

Sabaeian et al. "Thermal effects on double clad octagonal Yb:glass fiber laser", Optical Materials, vol. 31, pp. 1300-1305 (2009).*
Clarkson et al. "High-power wavelength combined cladding-pumped Tm-doped silica fiber lasers", Technical Digest, Conference on Lasers and Electro-Optics, IEEE Cat. No. 01CH37170, pp. 363-364 (2001).*
Brown, D.C., et al., "Thermal, stress, and thermo-optic effects in high average power double-clad silica fiber lasers," IEEE, J. Quantum Electron, vol. 37, pp. 207-217 (2001).

(Continued)

*Primary Examiner* — Eric Bolda
(74) *Attorney, Agent, or Firm* — Pierce Atwood LLP; Joseph M. Maraia

(57) ABSTRACT

In various embodiments, an optical element, e.g., an optical fiber, may be configured to compensate for thermal lensing. For example, thermal lensing may be caused by light power dissipation within an optical fiber, which may include a fiber core that guides amplified light along the longitudinal dimension of the fiber core. Thermal lensing from a thermally induced change in material refractive index as a function of position along dimensions perpendicular to the fiber's longitudinal dimension may be at least partially compensated or offset when light is guided by the fiber core by a designed-in effective refractive index profile selected such that the designed-in material refractive index of the fiber core changes as a function of transverse position within the fiber core, or by selection of a favorable cross-sectional core shape in a plane perpendicular to the longitudinal dimension of the fiber core.

25 Claims, 6 Drawing Sheets

(56) References Cited

OTHER PUBLICATIONS

Dawson, J. W., et al., "Analysis of the scalability of diffraction-limited fiber lasers and amplifiers to high average power," Opt. Exp., vol. 16, pp. 13240-13266 (2008).

Bass, M., Ed., Handbook of Optics, V., II, Chptr. 9, "Gradient Index Optics", TOC, p. 9.5, McGraw-Hill, Inc., NY (1995).

Emkey, W. L., et al., "Analysis and evaluation of graded-index fiber-lenses," J. Lightwave Tech., LT-15, pp. 1156-1164 (1987).

Shiraishi, K., et al., "Spotsize contraction in standard single-mode fibres by use of a GI-fiber tip with a high focusing parameter," IEEE Phot. Techn. Lett., vol. 10, 1757-1759 (1998).

Pan, J. J., et al., "Integration improves reliability and performance," WDM Solutions, vol. 9, p. 15-21 (1999).

Soodbiswas, S. K., et al., "Radial GRIN glasses in $Li_2$—$Na_2O$—$Al_2O_3$—$SiO_2$ systems," J. Materials Sci., vol. 33, p. 5401-5403 (1998).

Yariv, A., "Optical Electronics" (4th Ed.), TOC & pp. 57-61, Saunders College Publishing, PA (1971).

* cited by examiner

COMPENSATION OF THERMALLY INDUCED REFRACTIVE INDEX DISTORTIONS IN AN OPTICAL GAIN MEDIUM OR OTHER OPTICAL ELEMENT

BACKGROUND

This disclosure relates to compensation of thermally induced refractive index distortions in an optical gain medium or other optical element. Examples of thermally induced refractive index distortions may include lensing, higher order distortions, and/or other distortions.

Thermal lensing is a simple example of a thermally induced refractive index distortion. Thermal lensing is an effect induced by a spatially varying temperature in a medium through which light propagates such as, for example, a guiding medium configured to guide light, a gain medium configured for light amplification, and/or other media. The local change of the refractive index may be directly related to the local temperature rise or to stresses from non-uniform heating or the stress associated with expansion mismatches of mechanically connected components. Heating concurrent with the operation or use of such a medium may cause thermal lensing through one or more mechanisms. For example, when a beam of light propagates through the medium and the medium is cooled on its outer surface, the medium may be hotter or colder on the axis of the beam of light relative to outer regions of the beam causing a transverse profile of the refractive index of the medium.

FIG. 1 conceptually illustrates thermal lensing in medium 100 through which light propagates. Collimated beam 102 enters optically pumped medium 100 from the left. Absorption of power by the medium from the inputted "pump" beam may cause an outputted signal beam to be amplified. Such absorption may also cause heating of the medium and therefore create a temperature profile that causes a thermal lens to be experienced by the outputted signal beam. As absorbed heat dissipates away from beam axis 104, a temperature profile arises in medium 100. More specifically, medium 100 is hotter at beam axis 104 relative to outer regions of medium 100, as indicated by temperature profile 106. In temperature profile 106, T represents temperature and x represents the transverse position. Temperature profile 106 may be approximated as parabolic, however, medium 100 may exhibit other temperature profiles. This temperature profile induces thermal lensing in medium 100 by inducing a transverse profile of the refractive index of medium 100. Refractive index n may vary with temperature as dn/dT. As such, light propagating in medium 100 may be focused at focal point 108 and divergent beam 110 may be emitted from medium 100 to the right. Depending on the strength of the thermal lensing induced in medium 100, the physical dimensions of medium 100, and/or other factors, focal point 108 may reside within or outside of the medium 100.

In a different scenario than that shown in FIG. 1, a medium may be pumped by a laser. The signal beam itself can influence the temperature profile by the way it extracts energy from the pumped medium. However, the signal beam itself, without the pump beam, can cause heating that leads to a thermal lens. In general, both signal and pump may influence the shape and strength of a thermal lens.

Thermal-lens compensation of high-power, solid-state crystalline and glass lasers is an established part of solid-state laser engineering. Such compensation typically involves the use of a conventional negative spherical lens in series with the laser medium, with the focal length of the compensating lens being specified to compensate the thermal lens that develops at the desired operational conditions. In some cases, a monolithic structure may be employed, whereby the desired negative lens function is achieved by polishing the ends of the laser medium into concave surfaces with the radius of curvature of the concave surfaces being specified to provide the necessary compensation focal length.

Conventionally, fiber-based applications (e.g., lasers and amplifiers) have typically not displayed significant thermal lensing due to their inherent high operating efficiency and small transverse dimensions. However, as laser power is scaled to increasingly higher levels in fiber-based applications, and as the core diameter is increased to accommodate the higher power, a point is reached where thermal lensing must be compensated, for example, to avoid significant reductions in efficiency, beam quality, and/or other performance metrics. Traditional approaches for compensating thermal lensing in solid-state lasers are generally not applicable to fiber-based applications, because, in solid-state lasers, the thermal-lens focal lengths are typically much longer than the length of the laser medium. In high-power, fiber-based applications, however, the opposite may be true: the thermal focal length may be significantly shorter than the fiber length (e.g., by an order of magnitude or more). It is noteworthy that the distinction between solid-state and fiber-based lasers is becoming blurry. For example, stiff, rod-like fiber lasers are at the intersection of the traditional line of distinction.

SUMMARY

One aspect of this disclosure relates an optical fiber configured to compensate for thermal lensing caused by light absorption and/or amplification within the optical fiber. The optical fiber may include a fiber core configured to guide and amplify light along the longitudinal dimension of the fiber core. The amplification and/or absorption of the guided light may cause thermal lensing in the fiber core that is induced by a change in a refractive index as a function of position along one or more dimensions perpendicular to the longitudinal dimension of the fiber core. The fiber core may include a designed-in effective refractive index profile such that the designed-in effective refractive index of the fiber core changes as a function of the position along the one or more dimensions perpendicular to the longitudinal dimension of the fiber core. The designed-in effective refractive index profile may be selected to at least partially offset thermal lensing in the fiber core.

Another aspect of this disclosure relates to an optical fiber configured to compensate for thermal lensing caused by absorption of pump light and/or amplification of guided light within the optical fiber. The optical fiber may include a fiber core configured to guide light that is amplified along a longitudinal dimension of the fiber core. The absorption of pump light and/or the amplification of the guided light may cause thermal lensing in the fiber core induced by a change in a refractive index as a function of a position along one or more dimensions perpendicular to the longitudinal dimension of the fiber core. The fiber core may have a cross-sectional shape in a plane perpendicular to the longitudinal dimension of the fiber core. The cross-sectional shape may be configured to at least partially offset thermal lensing in at least one dimension perpendicular to the longitudinal dimension of the fiber core when light is guided by the fiber core.

Yet another aspect of this disclosure relates to a system configured to compensate for thermal lensing caused by dissipation of light energy therein. The system may include an optical element configured to facilitate light being amplified as it propagates through the optical element. The light amplification may cause thermal lensing in the optical element induced by a change in a refractive index as a function of position along one or more dimensions perpendicular to a direction of propagation of light through the optical element. The optical element may include a designed-in effective refractive index profile such that the designed-in effective refractive index of a preferred spatial mode of the optical element changes as a function of a position along one or more dimensions perpendicular to the direction of propagation of light through the optical element. The designed-in effective refractive index profile may be configured to at least partially offset thermal lensing of a preferred spatial mode of the optical element when light propagates through the optical element.

These and other features and characteristics of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

DETAILED DESCRIPTION

Embodiments of the present technology address compensation of thermally induced refractive index distortions in optical elements. As a simplistic example of a thermally induced refractive index distortion, thermal lensing is used herein to describe various embodiments. It is appreciated, however, that this is not intended to be limiting, as one or more embodiments may be implemented to compensate for other thermally induced refractive index distortions. Examples of other thermally induced refractive index distortions may include bi-focusing, and distortions due to a non-uniform heat-transfer coefficient at the thermal interface between a gain fiber and a heat sink, edge effects due to shape-induced thermal flux concentrations, and/or other refractive index distortions.

In general, if such a beam distortion is repeatable, then it may be compensated by an effective refractive index profile programmed or designed into the medium. The term effective refractive index is used to describe the local phase velocity of propagating light. The effective refractive index can be varied over a fiber cross-section, for example, by spatial variations of the core refractive index, spatial variations of the cladding refractive index, variations of the core shape, and/or other designed-in features that affect the local phase velocity of propagating light. This effective refractive index profile may correct the thermal distortion through an exact "negative" image of the distortion or through some other spatial refractive index pattern that is a spatial average of the distortion leading to an approximate compensation. Furthermore, it is noteworthy that thermally induced refractive index distortions may reach a steady state, or they may vary over time. In embodiments where the thermally induced refractive-index distortions vary over time, compensation may be applied according to some time-averaged refractive-index distortion.

While performance of a fiber may be primarily dependant on the refractive index of the fiber core material, in some embodiments, an "effective refractive index" of a preferred mode may also affect fiber performance. As mentioned above, the effective refractive index may depend on the refractive index of the fiber core and cladding media as well as the core geometry and the mode number of interest. Hence, the effective index may be changed without changing the material refractive index simply by changing the core geometry. For example, changing the cross-sectional shape of a fiber core may change the effective refractive index of a preferred mode. For a planar core configuration, where light diffraction within the core plane can be separable from diffraction perpendicular to the plane, changing the core thickness may also change the effective refractive index at different points along the cross section.

Figure 1:
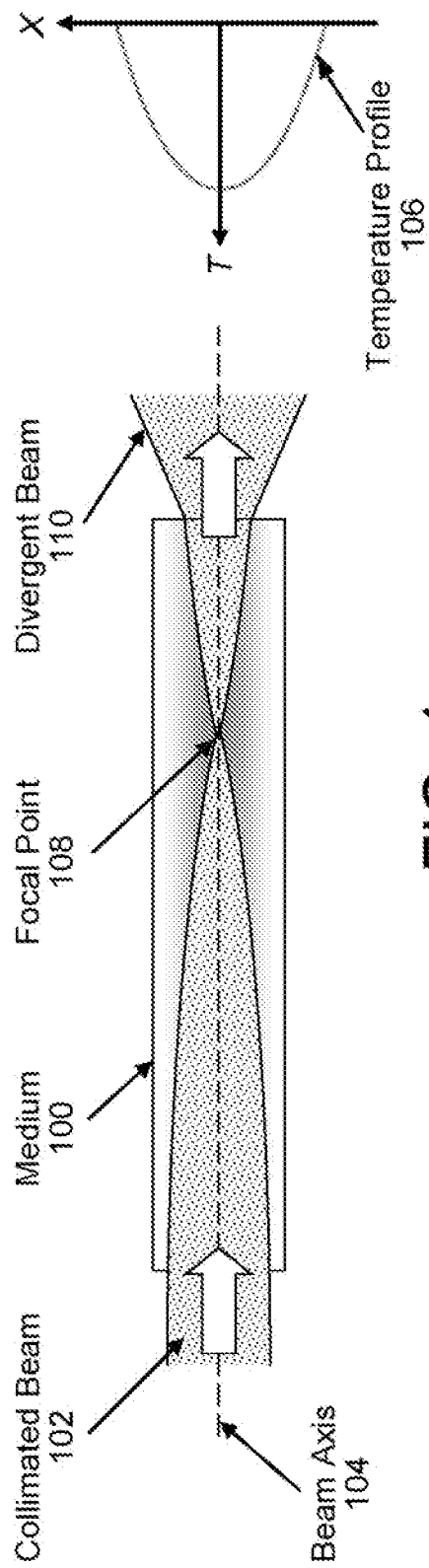
FIG. 1 conceptually illustrates thermal lensing in a medium through which light propagates.
Figure 2:
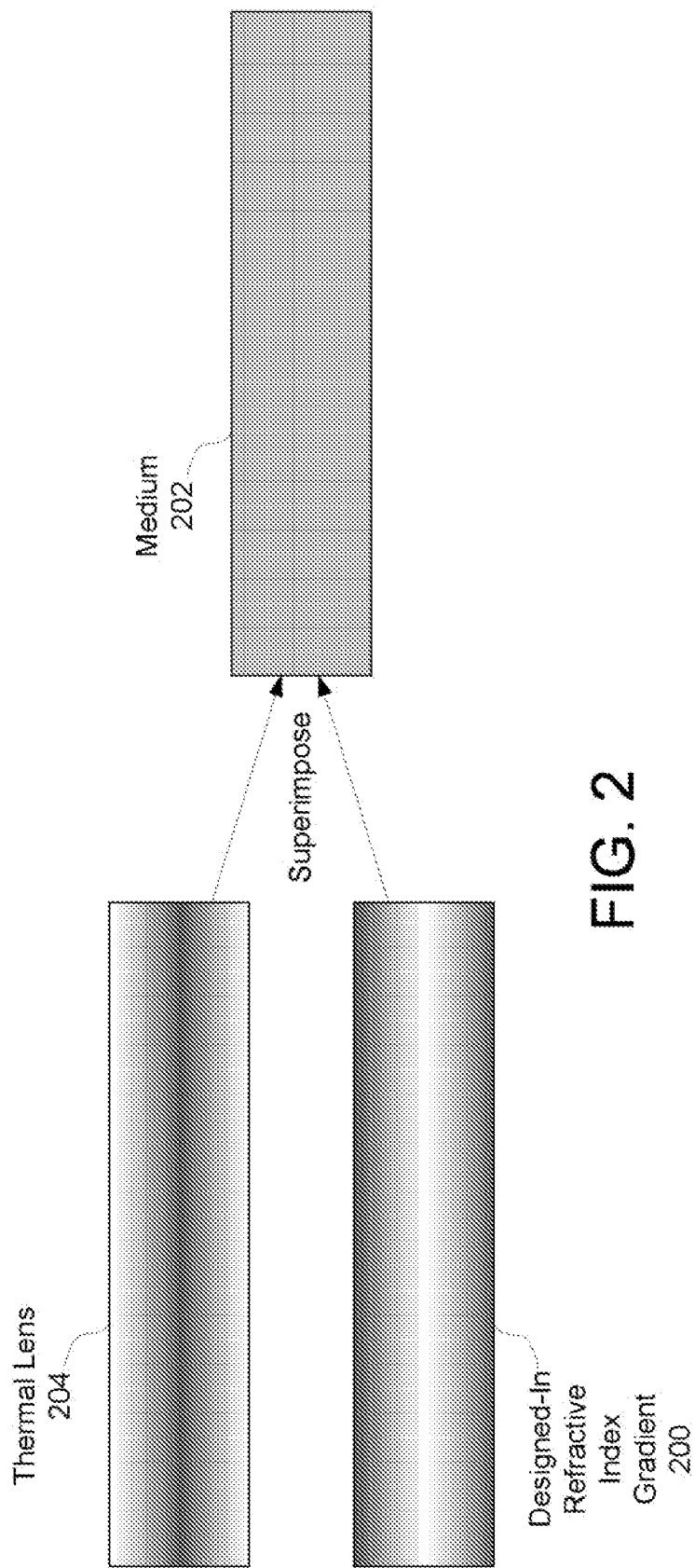
FIG. 2 conceptually illustrates thermal lensing compensation, in accordance with one or more embodiments.

FIG. 2 conceptually illustrates thermal lensing compensation, in accordance with one or more embodiments. More specifically, by introducing a designed-in refractive index profile 200 in medium 202, a thermally induced thermal lens 204 can be compensated. Medium 202 may be a guiding medium configured to guide light, a gain medium configured for light amplification, and/or other media through which light propagates. Thermal lens 204 may be similar to that described in connection with FIG. 1 in that thermal lens 204 is a transverse profile of the refractive index of medium 202 induced by a temperature profile in medium 202 caused by pump and signal light propagating from left to right, or vice versa. Designed-in refractive index profile 200 functions as a "negative" lens distributed across medium 202, and it is configured to cause a launched collimated light beam to diverge from the optical axis as it propagates through medium 202. In some embodiments, designed-in refractive index profile 200 may be an inverse of a refractive index profile attributed to thermal lens 204. Superimposition of designed-in refractive index profile 200 and thermal lens 204 in medium 202 yields an elimination or reduction of refractive index profile in medium 202. Resultantly, a collimated light beam that enters medium 202 may emerge from medium 202 as a collimated light beam, rather than being divergent as seen in FIG. 1.

This disclosure contemplates several techniques for introducing designed-in refractive index profiles into various media to compensate thermal lensing. For example, a designed-in refractive index profile may be introduced into a given medium by a doping profile in the medium that is configured to provide such a designed-in refractive index profile, a specially shaped guiding structure in the medium configured to provide an effective refractive index profile, stress in the medium that affects the refractive index of the medium so as to provide a refractive index profile, designed-in stress profile in the medium configured to provide a designed-in refractive index profile, and/or other techniques for providing designed-in refractive index profiles in the medium that compensate thermal lensing. These and other approaches for providing a designed-in refractive index profile in a medium may be fabricated by techniques known in the art. It should be appreciated that, while specific approaches for providing a designed-in refractive index profile in a medium are described herein, these are not intended to be limiting as other approaches for providing a designed-in refractive index profile in a medium to compensate thermal lensing fall within the scope of this disclosure.

Figure 3A:
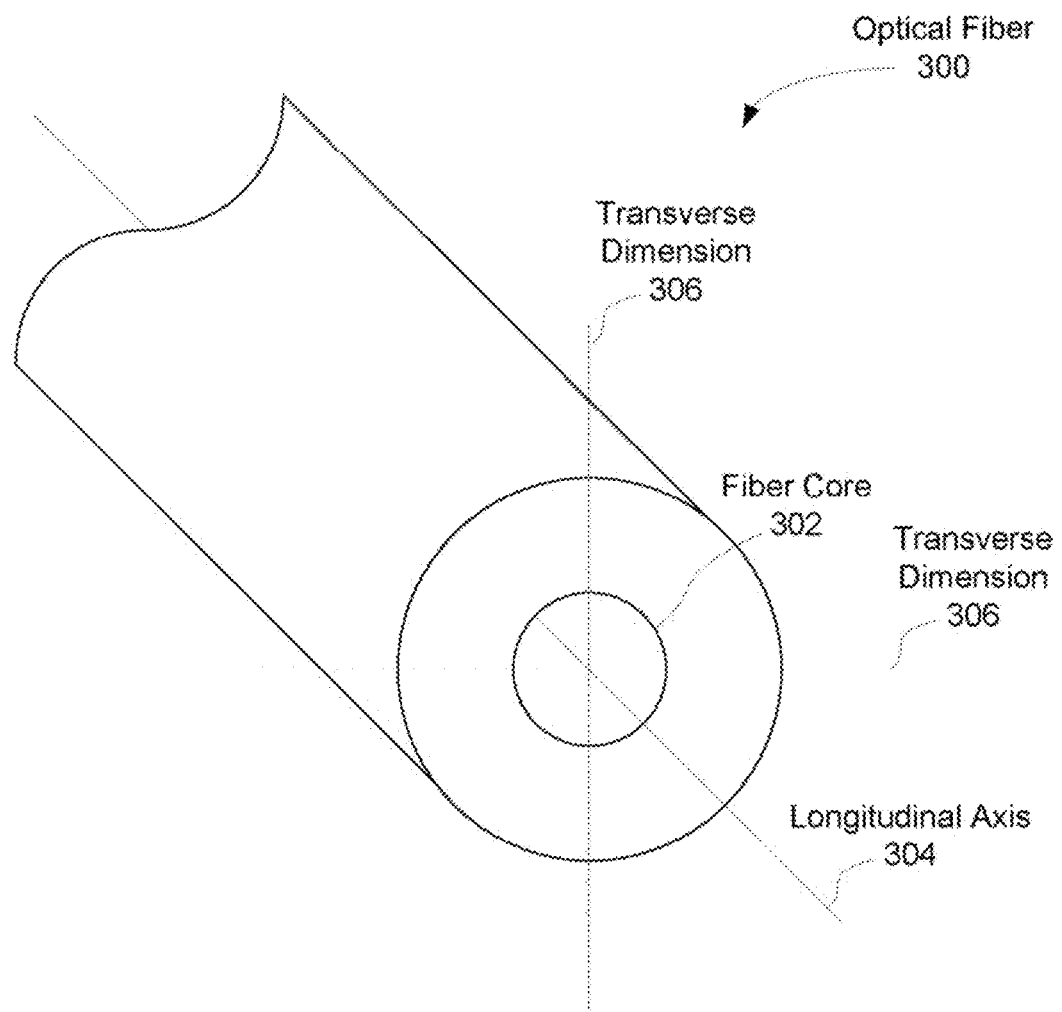
FIG. 3A generically illustrates an optical fiber having a fiber core and defines certain dimensions of the optical fiber.

FIG. 3A generically illustrates optical fiber 300 having fiber core 302 and defines certain dimensions of the optical fiber 300. It is noteworthy that the geometry of optical fiber 300 and fiber core 302 shown in FIG. 3A is not intended to be limiting. Rather, the optical fiber 300 and/or the fiber core 302 may have a variety of shapes and/or characteristics, as described further below. Optical fiber 300 may be configured to compensate for thermal lensing caused by light guiding and/or amplification within optical fiber 300. Optical fibers (e.g., fiber lasers and/or amplifiers) are presently of intense interest due to a broad range of performance features. These performance features may include high efficiency, robust single-mode output, high reliability, compact coiled packaging, large surface-area-to-volume ratio for favorable thermal performance, an all-fiber architecture without any free-space optics and hence no requirement for a rigid optical bench, and/or other factors.

Fiber core 302 may be configured to guide light that is amplified along the longitudinal dimension (i.e., the dimension parallel to longitudinal axis 304) of fiber core 302. Light absorption combined with cooling of the fiber outer surface may cause thermal lensing in fiber core 302. As discussed above, thermal lensing is a thermally induced change in refractive index as a function of position along one or more dimensions perpendicular to the longitudinal dimension of the fiber core (e.g. transverse dimensions 306). It should be appreciated that, while optical fiber 300 and fiber core 302 are depicted in FIG. 3A as having circular symmetry, optical fiber 300 and/or fiber core 302 may assume other geometries. For example, fiber core 302 may have a cross-section shaped as a rectangle. Alternative possibilities include an ellipse, hexagon, and/or other shapes. Furthermore, optical fiber 300 may include a plurality of fiber cores.

In order to compensate for thermal lensing induced in optical fiber 300, fiber core 302 may include a designed-in refractive index profile such that the designed-in refractive index of fiber core 302 changes as a function of position along one or more dimensions perpendicular to the longitudinal dimension of fiber core 302 (e.g. transverse dimensions 306). The designed-in refractive index profile may be configured to at least partially offset thermal lensing. In some embodiments, the designed-in refractive index profile included in fiber core 302 may be due to a doping spatial profile in fiber core 302 such that a concentration of one or more dopants changes as a function of position along one or more dimensions perpendicular to the longitudinal dimension of fiber core 302. Examples of dopants may include lasing ions such as rare earth elements including ytterbium and/or other dopants that can affect refractive index.

According to some embodiments, the designed-in refractive index profile may be due to a designed-in stress profile in the fiber core such that the magnitude of stress changes as a function of position along one or more dimensions perpendicular to the longitudinal dimension of fiber core 302. The designed-in stress profile may be approximately parabolic. In some embodiments, the stress profile may include a designed-in stress profile in fiber core 302 configured to provide a designed-in refractive index profile. Designed-in stress profiles may be introduced during fabrication of optical fiber 300.

Figure 3B:
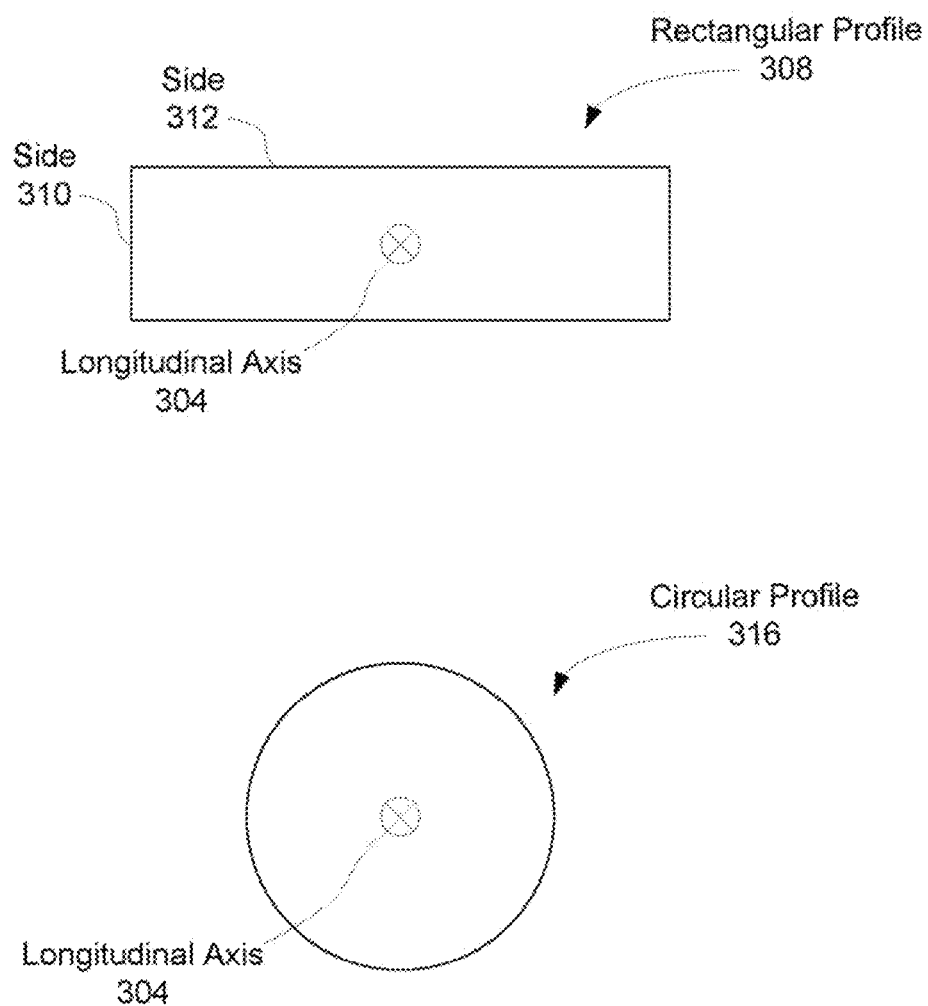
FIG. 3B illustrates a number of exemplary fiber core shapes that may be implemented in an optical fiber, in accordance with one or more embodiments.

FIG. 3B illustrates a number of exemplary fiber core shapes that may be implemented in optical fiber 300, in accordance with one or more embodiments. In some embodiments, fiber core 302 may have rectangular shape 308 in a plane perpendicular to the longitudinal dimension of fiber core 302. Rectangular shape 308 may include side 310 that is perpendicular to side 312. The length of side 310 may be significantly less than that of side 312. These dimensions are usually referred to as fast- and slow-axis dimensions, respectively, of fiber core 302. The designed-in refractive index profile of fiber core 302 may be configured such that the designed-in refractive index changes through the core as a function of position parallel to one or both of side 310 or side 312. The designed-in refractive index profile may be minimum at or near the center of rectangular shape 308. In various embodiments, the aspect ratio of rectangular shape 308 may be altered based on requirements of specific implementations. For example, rectangular shape 308 may include an aspect ratio of 30:1, 100:1, or greater, which may be determined based on optical power goals or other factors.

In some embodiments, conventional index-based guiding may be employed in only one transverse direction of rectangular shape 308 (e.g., the fast-axis direction). Such embodiments may be considered as "semi-guiding" configurations. Excellent beam quality may be possible even at high powers when index steps at the narrow edges of the wide, slow-axis core dimension of a semi-guiding fiber are made sufficiently small (e.g. $10^{-4}$). In the fast-axis direction, higher-order planar modes may be stripped out of fiber core 302 by coiling optical fiber 300. In the slow-axis direction, index-based guiding may not be employed, since such guiding may lead to highly multimode operation. Single-mode performance in the slow-axis direction may be achieved in a laser based on a semi-guiding fiber by using a resonator having a low-Fresnel number ~1 in the slow-axis plane. Slow-axis mode control may also be achieved using a combination of mode-dependent gain and mode-dependent loss, such that the lowest-order mode is strongly favored by a fiber designed to provide that mode with the greatest gain-loss difference.

In some embodiments that include circular shape 316, the designed-in refractive index profile may be configured such that the designed-in refractive index changes radially from the central longitudinal axis of the fiber core. In some embodiments that include circular shape 316, the designed-in refractive index profile may be configured such that the designed-in refractive index changes parabolically parallel to one or more directions perpendicular to longitudinal axis 304. The designed-in refractive index may be minimum at or near central longitudinal axis 304 in circular shape 316.

The desired effect of core-shape induced divergence from the core center can be provided by different methods, as is discussed below. In some embodiments, where the core dimensions are very different along the slow and fast axes, the divergence may be produced by transverse variations along the slow-axis direction of the local effective refractive index of the planar mode that is guided by the fast-axis claddings. The physical origin of this effect is the fact that, for the same core and cladding material indices, the planar mode effective index decreases if the planar core is made thinner. For a thinner core, the guided light has a wider divergence, which changes the effective phase velocity of the mode. In addition, for a thinner core, a larger portion of the mode amplitude extends out into the cladding, where the material refractive index is lower. For this reason, designing the core shape such that the local core thickness varies along the slow-axis direction may result in a synchronous variation in the local effective mode index, with the effective index being lower where core is thinner. By way of non-limiting example, the core with its minimal thickness, and lowest effective index, along the core longitudinal axis may provide a defocusing effect that can compensate for the thermal lensing produced by a local maximum in the temperature distribution that is also centered along the core longitudinal axis.

Figure 4:
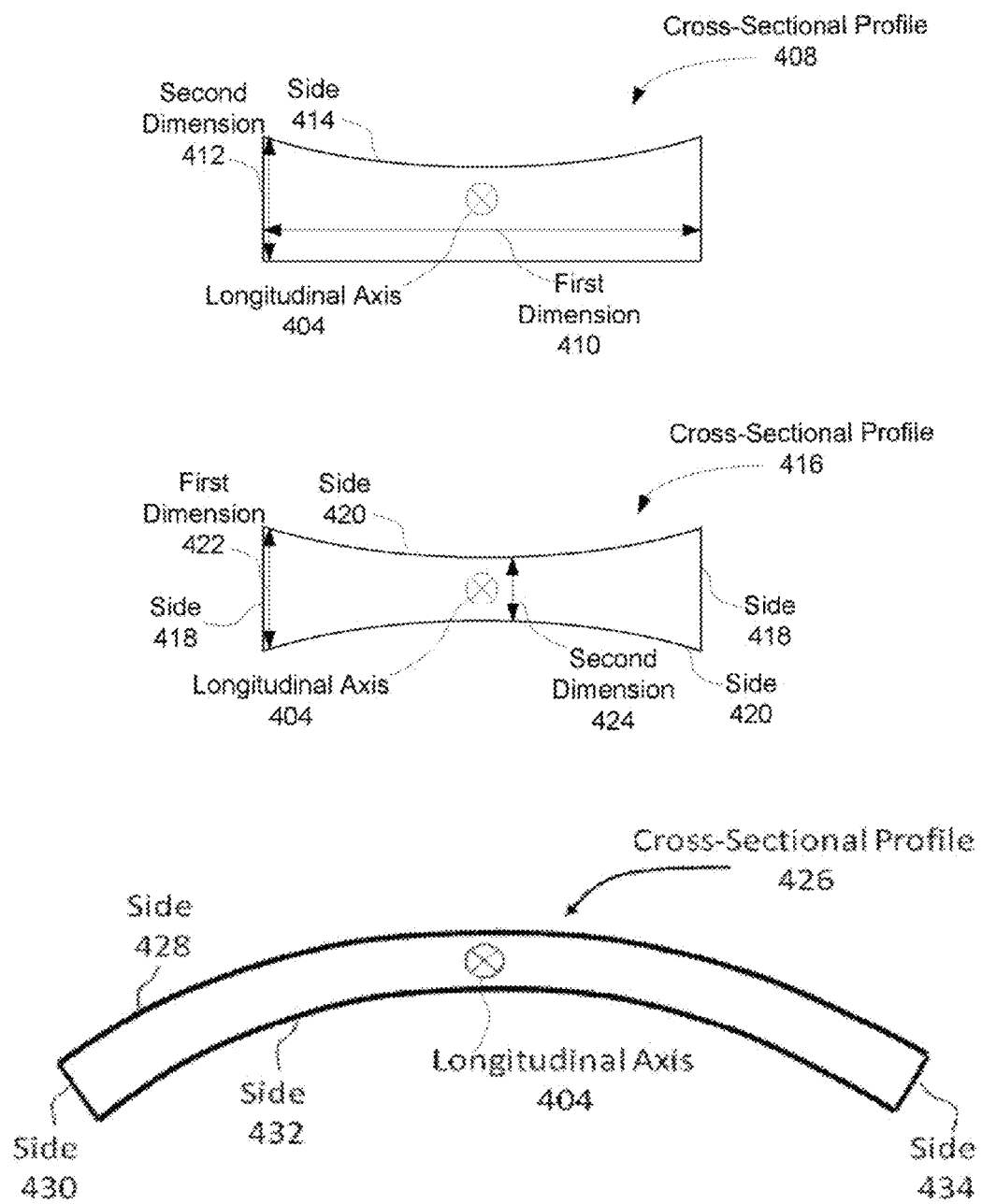
FIG. 4 illustrates a number of exemplary fiber core shapes that may be implemented in an optical fiber, in accordance with one or more embodiments.

FIG. 4 illustrates a number of exemplary fiber core shapes that may be implemented in an optical fiber, in accordance with one or more embodiments. Some embodiments of such an optical fiber may include a fiber core having cross-sectional shape 408. Cross-sectional shape 408 may include first dimension 410 and second dimension 412, both being perpendicular to longitudinal axis 404. Cross-sectional shape 408 may be shaped such that first dimension 410 is greater than second dimension 412. According to some embodiments, at least one side (e.g., side 414) of cross-sectional shape 408 may be concave toward longitudinal axis 404 of fiber core 402 to make the core thinner near the longitudinal axis.

Some embodiments of an optical fiber may include a fiber core having cross-sectional shape 416. Cross-sectional shape 416 may include two opposing sides 418 that are parallel to each other. Cross-sectional shape 416 may include two opposing sides 420 that are concave toward the longitudinal axis 404, thereby making the core thinner near the axis. In some embodiments, opposing sides 420 may have an approximately parabolic cross-sectional shape.

In accordance with some embodiments, an optical fiber may include a fiber core having cross-sectional shape 426. Cross-sectional profile 426 may include two opposite sides 428 and 432 that are curved parallel to each other or concentric. Optical rays propagating along the axis 404, but slightly tilted with respect to it, will be "pushed off" from the core center to core edges after multiple bounces between the fast-axis cladding.

According to some embodiments, the degree of thermal lensing may vary along the length of an optical fiber. This spatial dependence of the thermal lensing parallel to the longitudinal axis of the optical fiber may arise from one or more effects. An example of one such effect may be that, in a small-signal regime, the pump power of a source of light propagating in the optical fiber may create a heat load that is absorbed by the optical fiber near the pump light source. This heat load may vary along the length of the optical fiber, such as according to Beer's law. Some optical fibers may have light sources distributed along the length of the optical fibers with light being injected in one or both of the forward and backward directions. Such light sources may be distributed at certain length intervals (e.g., every one meter). As such, the strength of thermal lensing may vary periodically with a period equal to the spacing of the light sources. The magnitude of the temperature variation may depend on the spacing of the light sources, wherein the closer the light sources are spaced to one another, the more uniform the temperature will be. Another example of an effect leading to varied thermal lensing along the length of an optical fiber may include that, in a saturation regime, optical-power amplification, and the resulting heat load, may monotonically increase toward the output end of the optical fiber where most of the final optical power is produced. To address these and other effects that lead to varied thermal lensing along the length of an optical fiber, a designed-in refractive index profile may be varied along the length of the optical fiber, in some embodiments.

Figure 5:
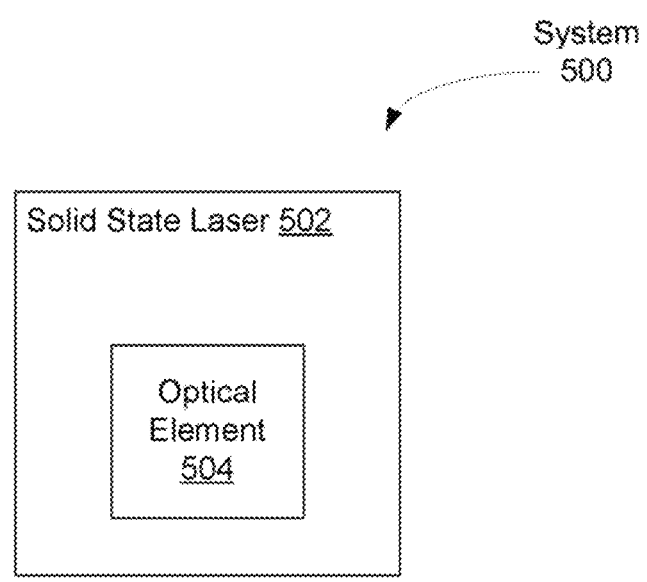
FIG. 5 illustrates a system configured to compensate for thermal lensing caused by light energy dissipation therein, in accordance with one or more embodiments.

FIG. 5 illustrates system 500 configured to compensate for thermal lensing caused by light energy dissipation therein, in accordance with one or more embodiments. As depicted in FIG. 5, system 500 may include solid state laser 502 and/or other components. Generally speaking, a solid state laser is a laser that uses a gain medium that is a solid, rather than a liquid such as in dye lasers or a gas as in gas lasers. Solid state lasers may include semiconductor-based lasers. In accordance with some embodiments, the solid-state laser 502 may include a conventionally grown laser crystal, various glass hosts, a ceramic solid-state laser, and/or other varieties of solid-state lasers. Some embodiments having a ceramic solid-state laser may include guided and/or unguided laser media.

System 500 may include optical element 504. According to various embodiments, optical element 504 may be included in solid state laser 502, or may be physically separate and distinct from solid state laser 502. Optical element 504 may be configured to facilitate light being amplified as it propagates through optical element 504. Light amplification may be accompanied by thermal lensing in optical element 504. Thermal lensing in optical element 504 is a thermally induced change in refractive index as a function of position along one or more dimensions perpendicular to the direction of propagation of light through optical element 504.

Optical element 504 may include a designed-in refractive index profile such that the designed-in refractive index of optical element 504 changes as a function of position along one or more dimensions perpendicular to the direction of propagation of light through optical element 504. The designed-in refractive index profile may be configured to at least partially offset thermal lensing in optical element 504 when light propagates through optical element 504. In some embodiments, the designed-in refractive index profile may be due to a doping profile in optical element 504 such that a concentration of one or more dopants changes as a function of position along one or more dimensions perpendicular to the direction of propagation of light through optical element 504. According to some embodiments, the designed-in refractive index profile may be due to an designed-in stress profile in optical element 504 such that the magnitude of designed-in stress changes as a function of position along one or more dimensions perpendicular to the direction of propagation of light through optical element 504. The designed-in stress profile is approximately parabolic, in some embodiments.

In some embodiments, optical element 504 may be configured as a planar waveguide, such that it provides optical guiding of a signal in one transverse dimension only, and free diffraction in the other transverse dimension. Such planar waveguide configurations may be subject to thermal lensing in one transverse dimension. When this is the case, the thermal lensing may be at least partially compensated by shaping the core guiding surfaces as schematically indicated in FIG. 4 and/or by employing the other approaches discussed herein to compensate the thermally induced distortions.

Although various embodiments have been described in detail for the purpose of illustration based on what is currently considered to be the most practical implementation, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that disclosure contemplates that, to the extent possible, one or more features of any embodiment can be combined with one or more features of any other embodiment.

What is claimed is:

1. An optical fiber configured to compensate for thermal lensing caused by light absorption and/or amplification within the optical fiber, the optical fiber comprising: a fiber core configured to guide and amplify light along the longitudinal dimension of the fiber core, the amplification and/or absorption of the guided light causing thermal lensing in the fiber core that is induced by a change in a refractive index as a function of position along one or more dimensions perpendicular to the longitudinal dimension of the fiber core, wherein the fiber core includes a designed-in effective refractive index profile such that the designed-in effective refractive index of the fiber core changes as a function of the position along the one or more dimensions perpendicular to the longitudinal dimension of the fiber core, the designed-in effective refractive index profile being selected to at least partially offset thermal lensing in at least one dimension perpendicular to the longitudinal dimension of the fiber core when light is guided by the fiber core, wherein the designed-in effective refractive index profile is provided by a predetermined cross-sectional shape of the fiber core, wherein the predetermined cross-sectional shape is selected such that a first core dimension perpendicular to the longitudinal dimension of the fiber core is greater than a second core dimension perpendicular to the longitudinal dimension of the fiber core, and wherein at least one side of the predetermined cross-sectional shape is concave toward a central longitudinal axis of the fiber core.

2. The optical fiber of claim 1, wherein the predetermined cross-sectional shape includes a first side perpendicular to a second side, the length of the first side being greater than the length of the second side.

3. The optical fiber of claim 2, wherein the designed-in effective refractive index profile is selected such that the designed-in effective refractive index of the fiber core changes as a function of position parallel to the first side of the predetermined cross-sectional shape.

4. The optical fiber of claim 3, wherein the designed-in effective refractive index profile is a minimum at or near the center of the predetermined cross-sectional shape.

5. The optical fiber of claim 4, wherein the designed-in effective refractive index profile is selected such that the designed-in effective refractive index of the fiber core varies approximately parabolically as a function of position parallel to one or both of the first side or the second side of the predetermined cross-sectional shape.

6. The optical fiber of claim 1, wherein the designed-in effective refractive index profile is configured such that the designed-in refractive index of the fiber core changes as a function of position parallel to one or both of the first dimension or the second dimension of the predetermined cross-sectional shape.

7. The optical fiber of claim 1, wherein the designed-in effective refractive index profile is configured such that the designed-in refractive index of the fiber core varies approximately parabolically as a function of position parallel to one or both of the first dimension or the second dimension of the predetermined cross-sectional shape.

8. The optical fiber of claim 1, wherein the designed-in refractive index profile is a minimum at or near the center of the predetermined cross-sectional shape of the fiber core.

9. The optical fiber of claim 1, wherein the fiber core has a circular shape in a plane perpendicular to the longitudinal dimension of the fiber core.

10. The optical fiber of claim 9, wherein the designed-in effective refractive index profile is configured such that the designed-in refractive index of the fiber core changes radially from the central longitudinal axis of the fiber core.

11. The optical fiber of claim 10, wherein the designed-in effective refractive index profile is minimum along the central longitudinal axis.

12. The optical fiber of claim 1, wherein a doping spatial profile in the fiber core is configured such that a concentration of one or more dopants changes as a function of the position along the one or more dimensions perpendicular to the longitudinal dimension of the fiber core.

13. The optical fiber of claim 1, wherein the designed-in effective refractive index profile is provided by a stress profile in the fiber core such that a magnitude of stress changes as a function of position along one or more dimensions perpendicular to the longitudinal dimension of the fiber core.

14. An optical fiber configured to compensate for thermal lensing caused by absorption of pump light and/or amplification of guided light within the optical fiber, the optical fiber comprising: a fiber core configured to guide light that is amplified along a longitudinal dimension of the fiber core, the absorption of pump light and/or the amplification of the guided light causing thermal lensing in the fiber core induced by a change in a refractive index as a function of a position along one or more dimensions perpendicular to the longitudinal dimension of the fiber core, wherein the fiber core has a predetermined cross-sectional shape in a plane perpendicular to the longitudinal dimension of the fiber core, the predetermined cross-sectional shape being configured to at least partially offset thermal lensing in at least one dimension perpendicular to the longitudinal dimension of the fiber core when light is guided by the fiber core, wherein the predetermined cross-sectional shape is selected such that a first core dimension perpendicular to the longitudinal dimension of the fiber core is greater than a second core dimension perpendicular to the longitudinal dimension of the fiber core, and wherein at least one side of the predetermined cross-sectional shape is concave toward a central longitudinal axis of the fiber core.

15. The optical fiber of claim 14, wherein the predetermined cross-sectional shape includes two first opposing sides that are straight and parallel to each other and two second opposing sides that are concave toward the central longitudinal axis of the fiber core.

16. The optical fiber of claim 15, wherein the two second opposing sides have approximately parabolic cross-sectional shapes that are concave toward the central longitudinal axis of the fiber core.

17. The optical fiber of claim 14, wherein the predetermined cross-sectional shape includes a first side and a second side, the first side and the second side opposing each other, the first side and the second side having approximately parabolic cross-sectional shapes, the first side being concave toward the central longitudinal axis of the fiber core and the second side being convex away from the central longitudinal axis.

18. The optical fiber of claim 14, wherein the predetermined cross-sectional shape causes light guided by the fiber core to diverge from a core center to core edges so as to at least partially offset thermal lensing in at least one dimension perpendicular to the longitudinal dimension of the fiber core when light is guided by the fiber core.

19. A system configured to compensate for thermal lensing caused by dissipation of light energy therein, the system comprising: an optical element configured to facilitate light being amplified as it propagates through the optical element, the light amplification causing thermal lensing in the optical element induced by a change in a refractive index as a function of position along one or more dimensions perpendicular to a direction of propagation of light through the optical element, wherein the optical element includes a designed-in effective refractive index profile such that the designed-in effective refractive index of a preferred spatial mode of the optical element changes as a function of a position along one or more dimensions perpendicular to the direction of propagation of light through the optical element, the designed-in effective refractive index profile configured to at least partially offset thermal lensing of a preferred spatial mode of the optical element when light propagates through the optical element, wherein the designed-in effective refractive index profile is provided by a predetermined cross-sectional shape of the optical element, the cross-sectional shape being in a plane perpendicular to the direction of propagation of light through the optical element, wherein the predetermined cross-sectional shape is selected such that a first core dimension perpendicular to the direction of propagation of light through the optical element is greater than a second core dimension perpendicular to the direction of propagation of light through the optical element, and wherein at least one side of the predetermined cross-sectional shape is concave toward a central longitudinal axis of the optical element.

20. The system of claim 19, further comprising a solid state laser, wherein the optical element is disposed within the solid state laser.

21. The system of claim 19, wherein a doping profile in the optical element is configured such that a concentration of one or more dopants changes as a function of the position along the one or more dimensions perpendicular to the direction of propagation of light through the optical element.

22. The system of claim 19, wherein the designed-in effective refractive index profile is provided by an designed-in stress profile in the optical element such that a magnitude of designed-in stress changes as a function of the position along the one or more dimensions perpendicular to the direction of propagation of light through the optical element.

23. The system of claim 22, wherein the designed-in stress profile is approximately parabolic.

24. The system of claim 19, wherein the optical element is configured as a planar waveguide that guides light in one transverse direction.

25. The system of claim 19, wherein the optical element includes a ceramic-based optical element.

\* \* \* \* \*